US010378958B2

(12) United States Patent
Avers et al.

(10) Patent No.: US 10,378,958 B2
(45) Date of Patent: Aug. 13, 2019

(54) STRUCTURALLY REINFORCED COMPOSITE COLD SHIELD FOR USE IN INFRARED SENSORS OR OTHER DEVICES

(71) Applicant: Raytheon Company, Waltham, MA (US)

(72) Inventors: Gavin L. Avers, Santa Barbara, CA (US); Michael L. Brest, Goleta, CA (US); Mark C. Elbogen, Santa Barbara, CA (US); Christopher J. Cobb, Goleta, CA (US); Daniel W. Rinehart, Goleta, CA (US); Jason S. Graham, Goleta, CA (US)

(73) Assignee: Raytheon Company, Waltham, MA (US)

( * ) Notice: Subject to any disclaimer, the term of this patent is extended or adjusted under 35 U.S.C. 154(b) by 128 days.

(21) Appl. No.: 15/483,219

(22) Filed: Apr. 10, 2017

(65) Prior Publication Data
US 2018/0292265 A1 Oct. 11, 2018

(51) Int. Cl.
G01J 5/06 (2006.01)
G01J 5/08 (2006.01)

(52) U.S. Cl.
CPC .............. *G01J 5/06* (2013.01); *G01J 5/061* (2013.01); *G01J 5/084* (2013.01); *G01J 5/0831* (2013.01); *G01J 5/0834* (2013.01); *G01J 2005/065* (2013.01)

(58) Field of Classification Search
CPC .. G01J 5/06; G01J 5/0834; G01J 5/061; G01J 5/0831; G01J 5/084; G01J 5/02; G01J 1/087; G03B 9/08
USPC ....................................................... 250/352
See application file for complete search history.

(56) References Cited

U.S. PATENT DOCUMENTS

| 5,196,106 A | 3/1993 | DuPree et al. |
| 5,277,782 A * | 1/1994 | DuPree ............. H01L 31/02164 205/67 |
| 5,315,116 A | 5/1994 | DuPree et al. |
| 5,932,360 A * | 8/1999 | Hazlitt ..................... G01J 5/06 205/67 |
| 7,332,720 B2 | 2/2008 | Minarik et al. |
| 2014/0123684 A1* | 5/2014 | Toft ..................... G01J 1/0271 62/6 |
| 2014/0363151 A1 | 12/2014 | Yanevich et al. |

OTHER PUBLICATIONS

International Search Report and Written Opinion of the International Searching Authority for PCT Patent Application No. PCT/US2017/063955 dated Mar. 15, 2018, 16 pages.

*Primary Examiner* — David P Porta
*Assistant Examiner* — Meenakshi S Sahu

(57) ABSTRACT

An Infrared Detector Dewar system includes a housing and an infrared detector. The system also includes one or more strut members coupled on a first end to the housing. The system further includes cold shield coupled to the infrared detector and to a second end of the one or more strut members. The cold shield includes a reinforcement ring aligned with the one or more strut members. The cold shield is formed by forming a support member having disc encased by a support ring. The support member is positioned within a mandrel such that the reinforcement ring is disposed to align with a strut position. The cold shield is then formed by electroplating copper over the mandrel and at least a portion of the support member, and then by removing/dissolving all aforementioned mandrels.

20 Claims, 6 Drawing Sheets

STRUCTURALLY REINFORCED COMPOSITE COLD SHIELD FOR USE IN INFRARED SENSORS OR OTHER DEVICES

TECHNICAL FIELD

This disclosure is generally directed to the design and manufacture of infrared sensor cold (or radiation) shields. More specifically, this disclosure is directed to a structurally reinforced composite cold shield for use in infrared sensors and other applicable devices.

BACKGROUND

An infrared (IR) detector is a device that reacts to infrared radiation and is used in camera systems, missile guidance systems, and the like. An IR detector often requires a cold shield to protect the IR detector from heating caused by thermal background radiation outside an optical field of view. The cold shield is usually cooled to a similar temperature as the IR detector. The cold shield is often formed by electroforming pure metals, such as copper or other thermally conductive metals, to enable the cold shield to rapidly cool near instantaneously and possess a low mass.

SUMMARY

This disclosure provides a structurally reinforced composite cold shield for use in infrared sensors and other devices.

In a first embodiment, a method includes forming a support member having a disc encased by a support ring. The method also includes positioning the support member within a mandrel such that the support member is disposed to align with a strut position, where the strut position includes a location for coupling to a planned strut member. In addition, the method includes forming a cold shield by electroplating copper over the mandrel and a portion of the support member.

In a second embodiment, a system includes a housing, an infrared detector, and one or more strut members each coupled on a first end to the housing. The system also includes a cold shield coupled to the infrared detector and to a second end of each of the one or more strut members. The cold shield includes a reinforcement ring aligned with the one or more strut members.

In a third embodiment, an apparatus includes a top surface adapted to couple to a variable aperture mechanism (VAM), where the top surface has an opening configured to align with an aperture of the VAM. The apparatus also includes a bottom portion configured to couple to a cooled object and a contact portion configured to couple to a strut. The top surface, bottom portion and contact portion form a continuous body. The apparatus further includes a plurality of baffles within the continuous body, where each of the baffles has an opening configured to align with the aperture of the VAM. In addition, the apparatus includes a reinforcement ring disposed to be aligned with the strut when the strut is coupled to the continuous body.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
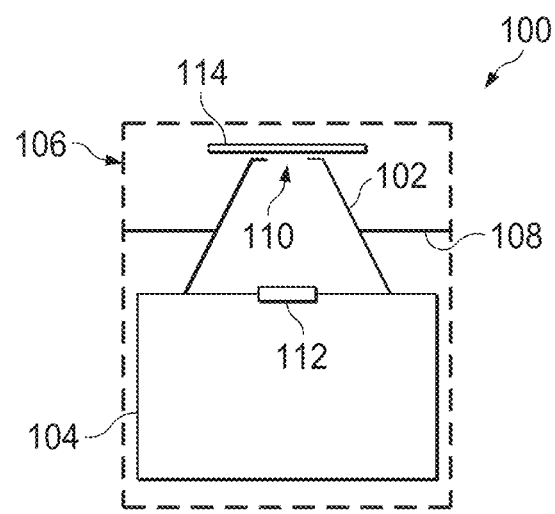
FIG. 1 illustrates an example infrared detection system utilizing a cold shield according to this disclosure.

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

An infrared (IR) sensor often requires a variable aperture mechanism (VAM) for its enabling technology. This type of sensor is typically mounted on top of a cold/radiation shield, which traditionally serves as a limiting aperture of an IR dewar. Cold/radiation shields are designed to be as light as possible, namely by having a thermally low Joule mass, so that they do not slow down the cryogenic cooling of a focal plane assembly (which includes the IR detector).

An IR detector system typically includes the IR detector, the cold shield, other cold-stage components, and, optionally, the VAM. When mounting a comparably heavy VAM assembly at the top of a cold shield, an IR detector system is at an increased risk of mechanical yield, mechanical failure, or both under realistically specified levels of shock, such as thermal shock and ballistic shock, vibration, or a combination thereof. Increasing the thickness or size of a cold shield to survive shock can result in reduced cooldown and readiness time of the system. Similarly, supporting the cold shield by physically attaching the cold shield to warm or ambient structures adds significant thermal parasitic losses in the IR dewar. Current solutions can fall short of optimizing both thermal and structural performance to satisfy necessary requirements with an acceptable and reliable amount of margin.

Some approaches incorporate a thin cold shield that is formed of pure nickel and electroformed. Other approaches use a combination of a titanium alloy strut and a pure nickel cold shield, which has been estimated (though not tested) to survive ballistic shock. Pure nickel has a very low thermal conduction coefficient, and thus a readiness time using pure nickel can be excessive (such as in excess of twelve minutes). Any joint, parasitic, or thickness variations in the pure nickel solution may not satisfy required performance specifications.

Conversely, approaches having a thin pure copper cold shield can provide significantly more thermal conduction than nickel. However, the copper cold shields often cannot survive ballistic shock under the weight of a VAM assembly. Even with a strategically placed strut, the low ultimate yield strength of copper cannot withstand required shock inputs of certain specifications.

Other approaches can utilize a multi-layered cold shield, such as one with nickel-copper-nickel (Ni—Cu—Ni) layers. The multi-layered assembly can be used in combination with a titanium alloy strut and provides increased conduction over a pure nickel cold shield. However, minimum layer thickness constraints of an electro-deposition process are such that the resultant parts are excessively massive, especially when part geometries are not optimized. The increased conduction is therefore nearly offset by an increase in total joule mass. This cold shield and strut design may meet certain specifications, but it provides very low margin to yield. Additionally, its manufacturing process is more complex, requires longer lead times, and is not a cost-effective solution.

This disclosure describes a structurally reinforced composite cold shield for use in infrared sensors and other devices, as well as a process for producing the same. The cold shield is adapted for use with a cooled object that needs low absorption and high reflectivity, such as for use with IR sensors. The cold shield is configured to be thermally light to enable rapid (possibly near instantaneous) cryogenic cooling of a focal plane assembly of an IR assembly. The cold shield is structurally reinforced to withstand vibration and shock. This disclosure also provides a structurally reinforced composite electroformed nickel-copper cold shield and method for producing the same that maximizes the benefits of each material.

FIG. 1 illustrates an example infrared detection system 100 utilizing a cold shield according to this disclosure. In the example shown in FIG. 1, the infrared detection system 100 can represent an IR dewar that includes a cold shield 102 coupled to an IR detector 104. The cold shield 102 is coupled to a housing 106 through one or more struts 108. The cold shield 102 includes a via or opening 110 aligned with one or more IR sensors 112 and a VAM 114 and is configured to provide a directed field of view for the one or more IR sensors 112.

The cold shield 102 is disposed over the IR detector 104 and is configured to be cooled and to shield a cooled object having a low absorption and high reflectivity, such as the IR detector 104. For example, the cold shield 102 can include a continuous body of copper that is able to protect the IR detector 104 from ambient thermal or IR radiation. The IR detector 104 is or includes a sensor that reacts to infrared radiation. Of course, embodiments with another object requiring protection from unwanted heating by thermal radiation or light could be used.

The VAM 114 is mounted on a top surface of and is aligned with the opening 110 of the cold shield 102. The VAM 114 includes an aperture mechanism that is configured to vary an aperture opening of the infrared detection system 100 to control how collimated IR radiation is admitted into the infrared detection system 100. The struts 108 are coupled between the cold shield 102 and the housing 106 and are configured to maintain an assembly including the VAM 114, cold shield 102, and IR detector 104 in place within the housing 106.

Figure 2:
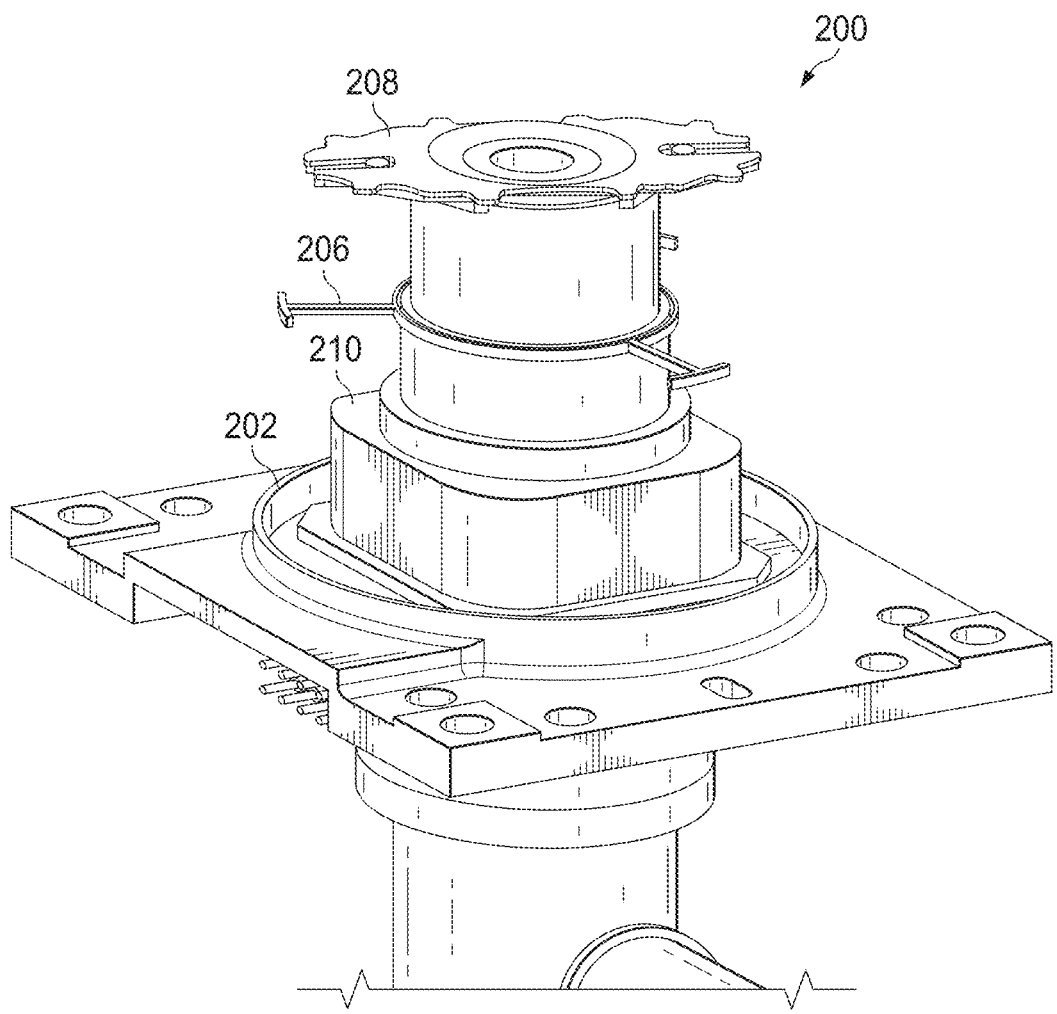
FIGS. 2 through 4 illustrate an example cold shield for an infrared detection system according to this disclosure.
Figure 3:
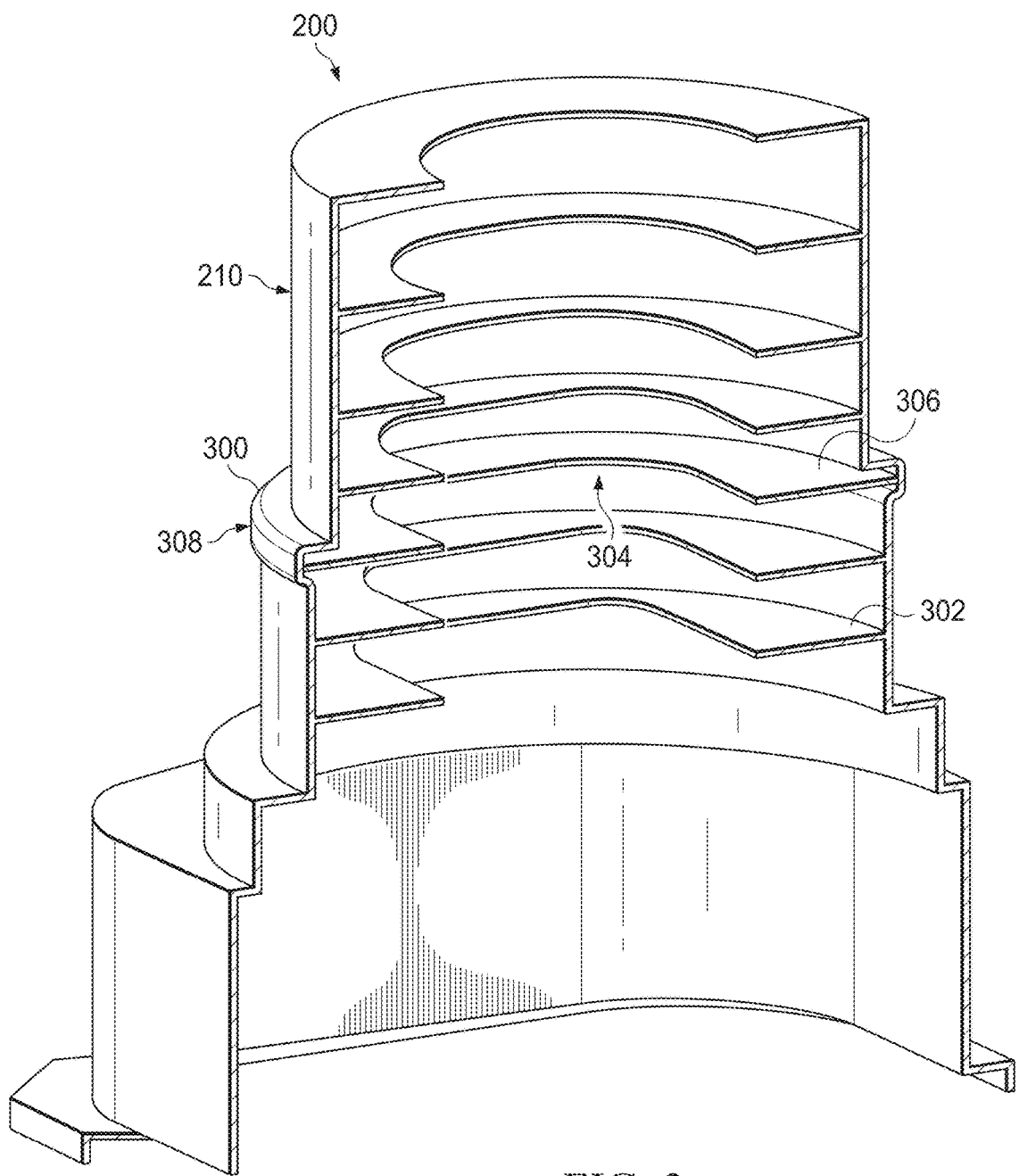
Figure 4:
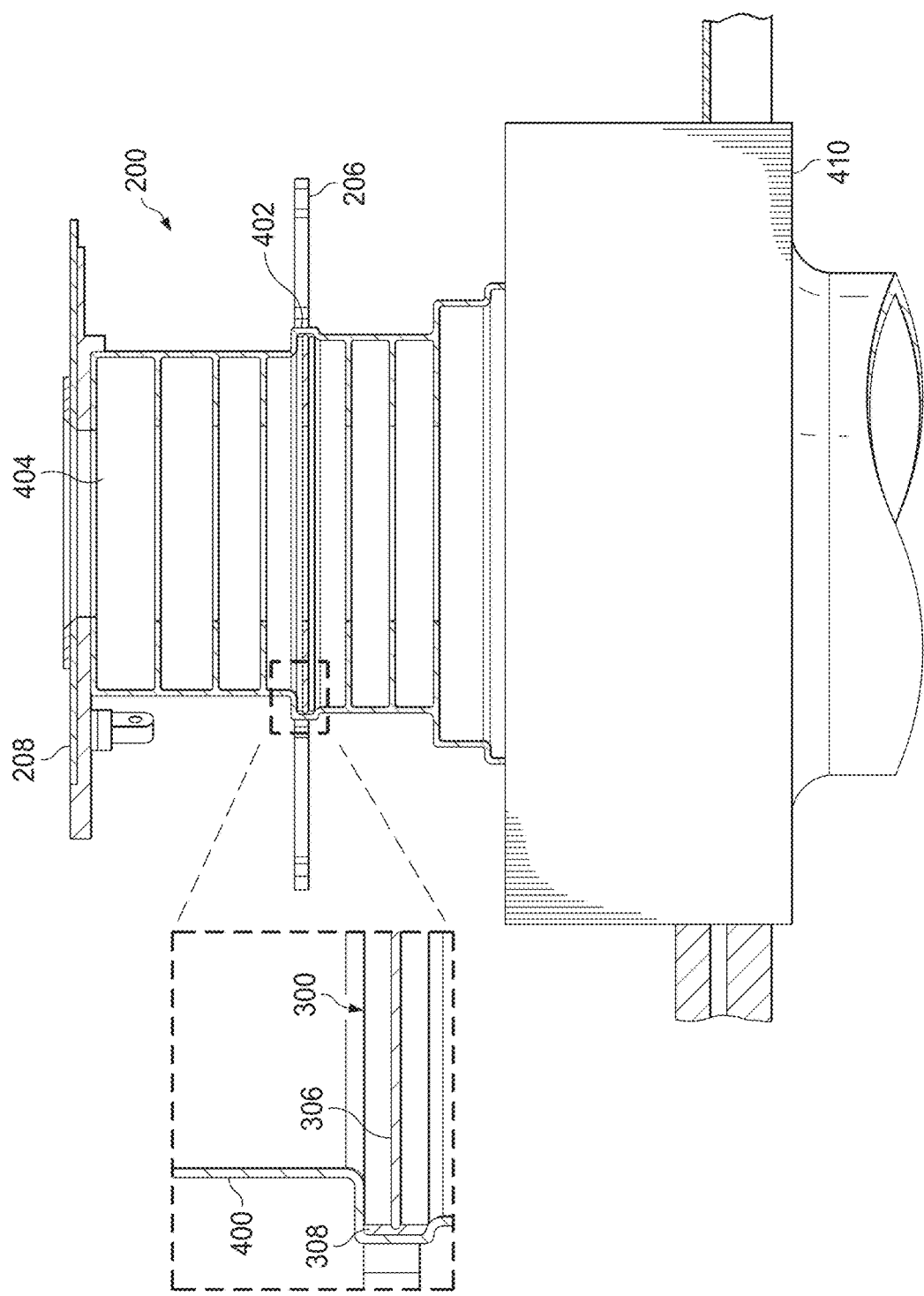

FIGS. 2 through 4 illustrate an example cold shield 200 for an infrared detection system according to this disclosure. In the example shown in FIGS. 2 through 4, an IR detector assembly includes the cold shield 200 coupled to an IR detector 202, one or more struts or strut assemblies 206, and a VAM 208. However, the cold shield 200 could be used in any other suitable system.

In some embodiments, a majority of the cold shield 200 is formed using copper, such as 0.005" thick copper, which can provide ample thermal conduction from a 75 K or other cold stage to the VAM 208, which could be mounted approximately one inch away from the top of the cold shield 200. Also, in some embodiments, a body 210 of the cold shield 200 could be fabricated via electroformed plating over one or more mandrels 404 (which are later dissolved) to produce a continuous copper body. In particular embodiments, the cold shield 200 can be dimensioned to have a mass of approximately four grams. The VAM 208 is able to vary an aperture opening to control how IR radiation is admitted to the IR detector 202. In particular embodiments, the VAM 208 could have a mass of approximately three grams.

The cold shield 200 includes a reinforcement ring 300 positioned among a plurality of baffles 302. The reinforcement ring 300 can denote a reinforced middle baffle disposed near a vertical center of the cold shield 200 or other baffle of the plurality of baffles 302. The reinforcement ring 300 includes an opening 304 defined by a disc or thin plate 306 that is fully encased in a support ring 308. For example, the reinforcement ring 300 can be formed by a disc that is cut from 0.003-0.005" nickel sheet stock and that is fully encased in a 0.020" tall nickel support ring. In addition, copper 400 can be electroplated or otherwise deposited over the reinforcement ring 300, such as in the same manner as the copper that is plated over the mandrel(s) 404 that are dissolved away later in the fabrication process of the remainder of the cold shield 200.

As shown in FIG. 4, the cold shield 200 includes an upper surface configured to be coupled to the VAM 208. The cold shield 200 also has a continuous copper body with a bottom portion, edge, or surface adapted to couple to a cooled object 410. The cold shield 200, VAM 208, and cooled object 410 can be included within a dewar assembly.

In the dewar assembly, such as the infrared detection system 100 of FIG. 1, a titanium alloy (such as Ti-6Al-4V) or a nickel-alloy (such as Kovar or Inconnel) strut assembly 206 having one or more struts can be welded or otherwise attached to the inside walls of the dewar, such as the inside walls of the housing 106. The strut assembly 206 is positioned in line with the reinforcement ring 300 of the cold shield 200. In particular embodiments, a gap (such as one of approximately 0.020") between the strut assembly 206 and the cold shield 200 can be filled with a thermally insulative epoxy 402.

Figure 5A:
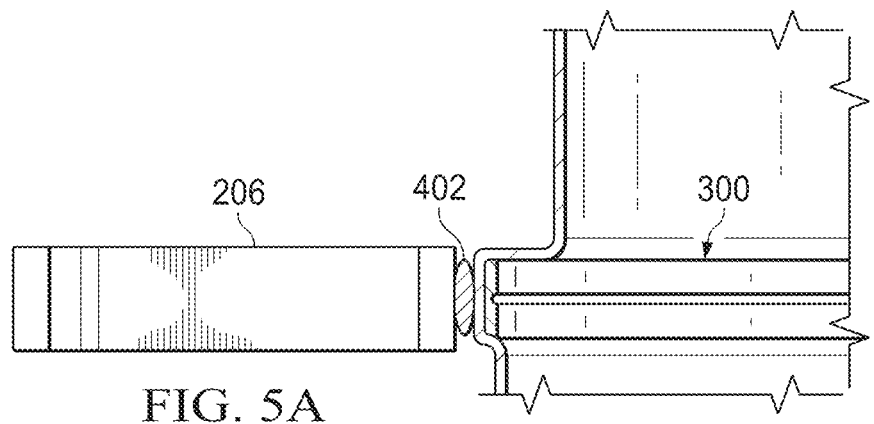
FIGS. 5A through 5E illustrate example alignments of a reinforcement ring and strut assembly according to this disclosure.
Figure 5B:
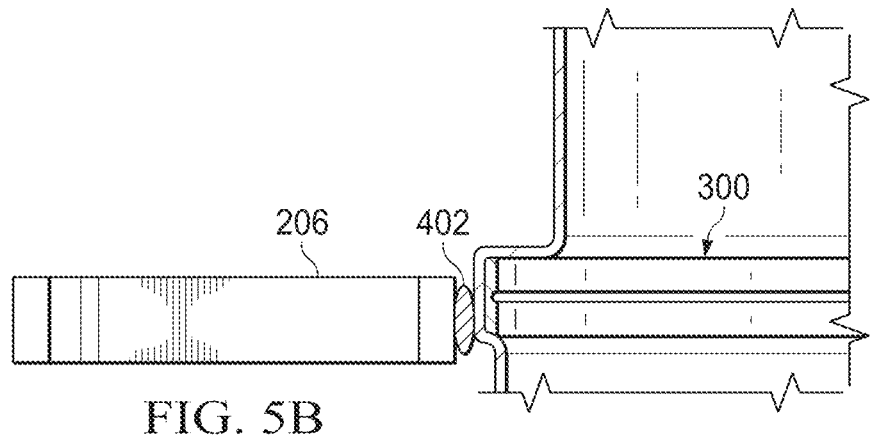
Figure 5C:
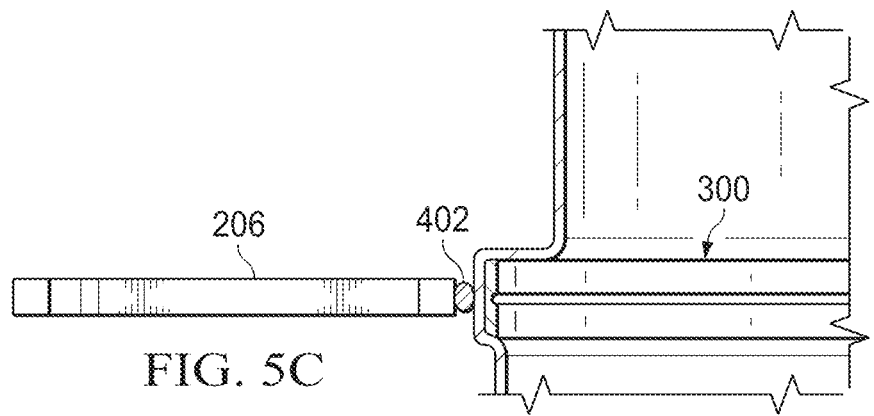
Figure 5D:
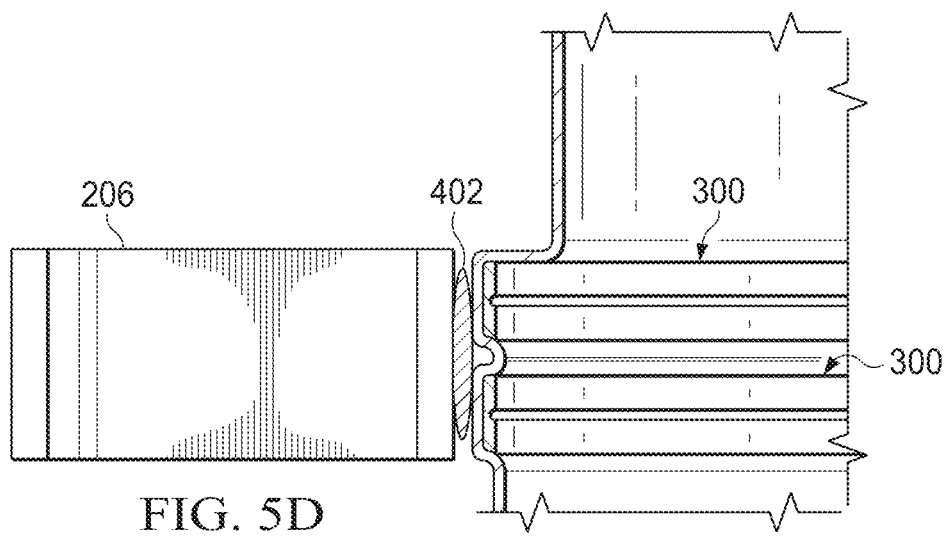
Figure 5E:
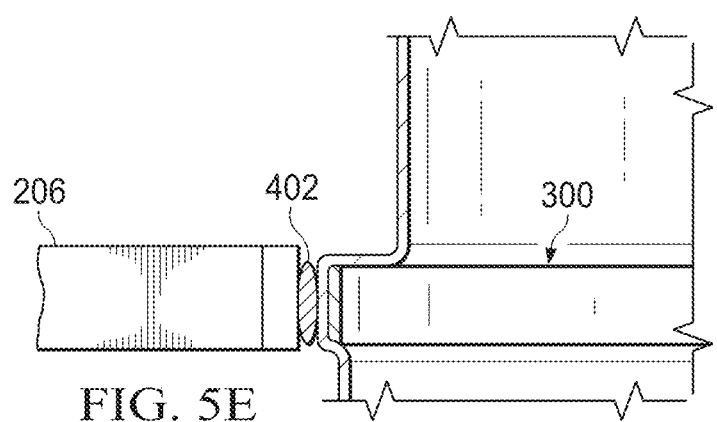

FIGS. 5A through 5E illustrate example alignments of a reinforcement ring 300 and strut assembly 206 according to this disclosure. In some embodiments, the reinforcement ring 300 is positioned within the top and bottom surfaces of the strut assembly 206 as shown in FIG. 5A. In other embodiments, only a portion of the lateral surface of the reinforcement ring 300, namely a portion less than the entire lateral surface of the reinforcement ring 300, overlaps a lateral portion or all of the lateral surface of the strut assembly 206 as shown in FIGS. 5B and 5C. In particular embodiments, the cold shield 200 includes a plurality reinforcement rings 300 aligned with one or more strut assemblies 206 as shown in FIG. 5D. For example, the cold shield 200 can include two reinforcement rings 300 aligned with one strut assembly 206 or two reinforcement rings 300 aligned respectively with two strut assemblies 206. In particular embodiments, the reinforcement ring 300 does not include plate 306, as shown in FIG. 5E. For example, the reinforcement ring 300 can include only the support ring 308, which does not include or encase a baffle or plate 306. A hoop strength of the support ring 308 alone is configured for use in conjunction with the strut assembly 206 for shock survivability.

Figure 6:
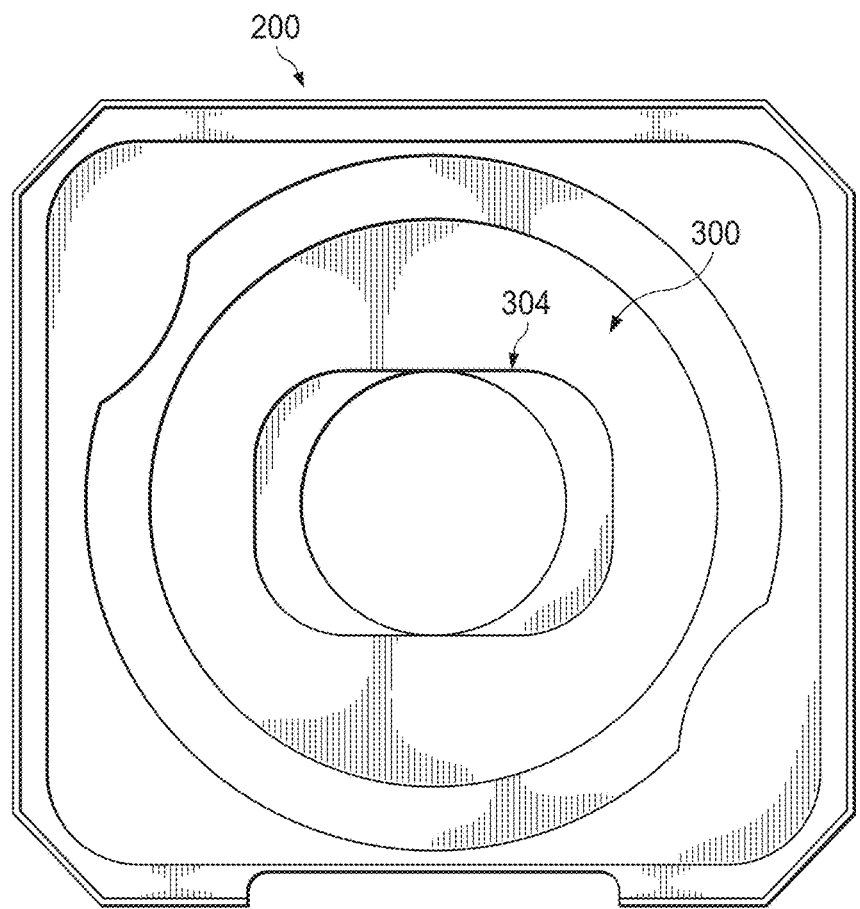
FIG. 6 illustrates an example plan view of a reinforcement ring in the cold shield according to this disclosure.

FIG. 6 illustrates an example plan view of a reinforcement ring 300 in the cold shield 200 according to this disclosure. In the example shown in FIG. 6, the reinforcement ring 300 includes an opening 304 aligned with the aperture of the VAM 208. Copper 400 can be electroplated over the lateral surfaces of the reinforcement ring 300 as noted above. Copper is not electroplated over the top and bottom surfaces of the reinforcement ring 300.

Although FIGS. 2 through 6 illustrate one example of a cold shield architecture for infrared detection systems or other devices, various changes may be made to FIGS. 2 through 6. For example, although the cold shield architecture is described as using copper, nickel, and titanium, other metals or materials having a low joule mass and comparable tensile and tension strength could be used. Also, although the cold shield architecture is illustrated as having a single reinforcement ring 300, other embodiments having more than one reinforcement ring or baffle could be used.

Figure 7:
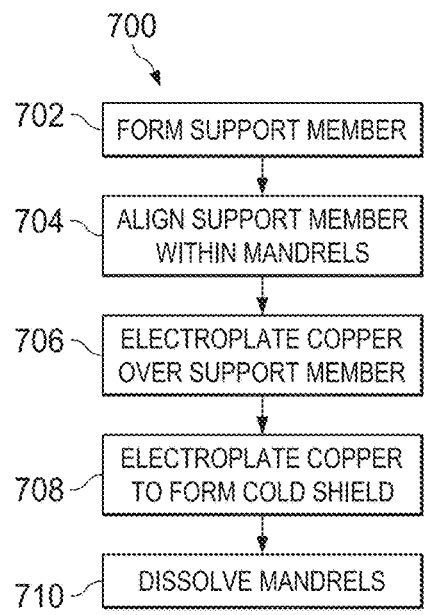
FIG. 7 illustrates an example method for producing a cold shield having a reinforcement ring according to this disclosure.

FIG. 7 illustrates an example method 700 for producing a cold shield having a reinforcement ring according to this disclosure. For ease of explanation, the method 700 is described with respect to the cold shield 200 of FIGS. 2 through 4. However, the method 700 could be used with any other suitable cold shield and any other suitable system.

In step 702, a support member (such as a reinforcement ring 300) is formed. This could include, for example, coupling a metal sheet to a support ring. The metal sheet and support ring can be formed of the same material or different materials. For instance, the metal sheet and the support ring can each be formed from a metal, such as nickel. The metal sheet and support ring can be coupled in any suitable manner, such as welding, bonding, fastening, and the like. In some embodiments, the metal sheet is machined in the form of a metal baffle and encased in a nickel hoop, forming a reinforced baffle. In other embodiments, the support member is machined from a single piece of metal to form a solid single body support member having a support ring 308 and plate 306. In still other embodiments, the support member is formed by nickel electroplating to form the support ring 308 and plate 306.

In step 704, the support member is positioned within one or more mandrels 404 to form a plurality of baffles 302 and the walls of a cold shield 200. In some embodiments, the support member can be positioned within a mandrel 404 to be at a planned center vertical height of the cold shield 200 and in alignment with a planned in-dewar strut 206 of an IR dewar.

In step 706, copper is electroplated around the support member. For example, copper electroplating can be performed on the lateral ring portion of the support member without electroplating copper onto the metal sheet (the plate or baffle). In step 708, the copper electroplating is performed as a part of the electroplating of a cold shield 200 in which copper is plated over the mandrels 404. In step 710, the mandrels 404 are dissolved, leaving only the support member encased within the electroplated copper of the cold shield 200.

Encasing a baffle in a nickel or other hoop and subsequently electroplating copper around that hoop provides the structural rigidity desired for a cold shield in a dewar system while maintaining ample thermal conduction properties for the VAM. The strategic placement of the support ring in line with an in-dewar strut can provide significant margin to a dewar-cooler bench in terms of its performance, shock, and environmental requirements.

Although FIG. 7 illustrates one example of a method 700 for producing a cold shield having a reinforcement ring, various changes may be made to FIG. 7. For example, while shown as a series of steps, various steps in FIG. 7 could overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   forming a support member having a disc encased by a support ring;
   positioning the support member within a mandrel such that the support member is disposed to align laterally with a strut position, the strut position comprising a location for coupling to a strut member; and
   forming a cold shield by electroplating copper over the mandrel and a portion of the support member.

2. The method of claim 1, wherein forming the support member comprises electroplating nickel to form the disc and the support ring.

3. The method of claim 1, further comprising:
   dissolving the mandrel.

4. The method of claim 1, wherein:
   the cold shield comprises a continuous copper body; and
   the support member comprises a nickel support baffle.

5. The method of claim 1, wherein the mandrel is configured to form a plurality of baffles.

6. The method of claim 5, wherein the support member comprises a baffle disposed within the plurality of baffles.

7. The method of claim 5, wherein forming the cold shield comprises electroplating copper to form each of the plurality of baffles.

8. A system comprising:
a housing;
an infrared detector;
one or more strut members each coupled on a first end to the housing; and
a cold shield coupled to the infrared detector and to a second end of each of the one or more strut members, the cold shield comprising a reinforcement ring aligned with the one or more strut members.

9. The system of claim 8, wherein:
the cold shield comprises copper; and
the reinforcement ring comprises nickel.

10. The system of claim 8, wherein:
the cold shield comprises a continuous copper body; and
a portion of the copper is disposed over a portion of the reinforcement ring.

11. The system of claim 8, wherein the reinforcement ring comprises one or more reinforced baffles among a plurality of baffles in the cold shield.

12. The system of claim 8, wherein the reinforcement ring is aligned with the one or more strut members such that at least a portion of a lateral surface of the reinforcement ring is aligned with at least a portion of the one or more strut members.

13. The system of claim 8, wherein the cold shield comprises at least two reinforcement rings aligned with the one or more strut members.

14. The system of claim 8, wherein the reinforcement ring comprises:
a disc having an opening disposed in a center of the disc; and
a support ring around an outer edge of the disc.

15. An apparatus comprising:
a top surface adapted to couple to a variable aperture mechanism (VAM), the top surface having an opening configured to align with an aperture of the VAM;
a bottom portion configured to couple to a cooled object;
a contact portion configured to couple to a strut, wherein the top surface, bottom portion and contact portion form a continuous body;
a plurality of baffles within the continuous body, each of the baffles having an opening configured to align with the aperture of the VAM; and
a reinforcement ring disposed to be aligned with the strut when the strut is coupled to the continuous body.

16. The apparatus of claim 15, wherein:
the continuous body comprises copper and the reinforcement ring comprises nickel.

17. The apparatus of claim 16, wherein at least a portion of the copper is disposed over a portion of the reinforcement ring and wherein the reinforcement ring comprises:
a disc having an opening disposed to align with the aperture of the VAM; and
a support ring disposed to encase an outer edge of the disc.

18. The apparatus of claim 15, wherein the reinforcement ring comprises one or more reinforced baffles among the plurality of baffles in the continuous body.

19. The apparatus of claim 15, wherein the reinforcement ring is disposed to align with the strut such that at least a portion of a lateral surface is aligned with at least a portion of the strut.

20. The apparatus of claim 15, wherein the continuous body comprises at least two reinforcement rings aligned with one or more struts.

* * * * *